United States Patent [19]

Cassetta et al.

[11] Patent Number: 5,738,896
[45] Date of Patent: Apr. 14, 1998

[54] SPIRAL SHAPED, DRIED PASTA FOOD COMPOSITION AND A METHOD FOR MAKING IT

[75] Inventors: James Vincent Cassetta, Pearl River, N.Y.; Dominick Piccininni, Lodi, N.J.

[73] Assignee: Lipton, Division of Conopco, Inc., Englewood Cliffs, N.J.

[21] Appl. No.: 550,125

[22] Filed: Oct. 27, 1995

[51] Int. Cl.$^6$ .................................................. A23L 1/16
[52] U.S. Cl. .................... 426/557; 426/128; 426/289; 426/451; 426/500; 426/503
[58] Field of Search ........................ 426/557, 451, 426/500, 128, 289, 503, 504, 517

[56] References Cited

U.S. PATENT DOCUMENTS

| | | |
|---|---|---|
| 2,352,617 | 7/1944 | Cohen et al. . |
| 2,357,585 | 9/1944 | Galvin et al. . |
| 2,383,774 | 8/1945 | Cohen et al. . |
| 2,576,670 | 11/1951 | Cohen . |
| 3,615,597 | 10/1971 | Durst et al. . |
| 3,798,343 | 3/1974 | Vitale . |
| 4,208,439 | 6/1980 | Hsu ............................ 426/242 |
| 4,323,585 | 4/1982 | Manser . |
| 4,394,397 | 7/1983 | Lometillo et al. .................. 426/557 |
| 4,515,817 | 5/1985 | Pavan ............................ 426/106 |
| 4,847,098 | 7/1989 | Langler . |
| 4,853,236 | 8/1989 | Langler . |
| 4,882,175 | 11/1989 | Ream et al. . |
| 4,976,982 | 12/1990 | Gillmore et al. .................. 426/557 |
| 4,988,528 | 1/1991 | Tomoda . |
| 5,124,168 | 6/1992 | McMillin et al. .................. 426/557 |
| 5,186,969 | 2/1993 | Jor . |
| 5,358,727 | 10/1994 | Yates et al. . |
| 5,410,857 | 5/1995 | Utley . |
| 5,500,236 | 3/1996 | Miller et al. .................. 426/451 |
| 5,508,053 | 4/1996 | Villota et al. .................. 426/557 |

FOREIGN PATENT DOCUMENTS 1594713  8/1981  United Kingdom .

OTHER PUBLICATIONS

Baroni, D., "Chapter 10—Manufacture of pasta Products", *Macaroni Products, Manufacture, Processing and Packaging*, by Dr. Charles Hummel, London, Food Trade Press Ltd., (1966) pp. 191–203.

Hummel, C., "Chapter 3—ingredients Used in the Manufacture of Macaroni Products", *Macaroni Products, Manufacture, Processing and Packaging*, London, Food Trade Press Ltd., (1966) pp. 15–21.

Hummel, C., *Macaroni Products, Manufacture, Processing and Packaging* London, Food Trade Press Ltd., (1966) pp. 1–6.

*Primary Examiner*—Lien Tran
*Attorney, Agent, or Firm*—James J. Farrell

[57] ABSTRACT

A spiral wound instant pasta noodle is disclosed which employs selected dusting agents interleaved within the spiral to insure unrolling of the spiral upon subsequent boiling. A method for the preparation of the noodle is also disclosed along with a system for packing the noodles in flexible envelopes to reduce breakage of the noodles and to permit inclusion of noodles longer than the flexible package filling aperture and reducing the incidence of perforation of the package.

8 Claims, 2 Drawing Sheets

5,738,896

SPIRAL SHAPED, DRIED PASTA FOOD COMPOSITION AND A METHOD FOR MAKING IT

BACKGROUND OF THE INVENTION

1. Field of the Invention

This invention relates to novel space-saving shapes of instant pasta noodles and methods for preparing the shapes of noodles together with additives which when added to the pasta allow it to be prepared in the novel shapes but still permit it to separate upon cooking, for example, boiling.

2. Description of the Cited Art

Generally, the use of grains, particularly farinaceous-based grains, to prepare cooked products has been in existence for many years, perhaps as early as the first century A.D. Over the years there have been many methods for making such farinaceous products and for making such products in various shapes.

The products with which this invention is concerned are mainly pasta products preferably prepared from semolina which is preferably the main raw material used in manufacture. This is preferably milled from hard wheat and most preferably from durum wheat. There are many references to obtaining and preparing semolina wheat flour, one of which is in Chapter 3, entitled "Ingredients Used in the Manufacture of Macaroni Products" pp. 15–21 from a book entitled *Macaroni Products, Manufacture, Processing and Packaging* by Dr. Charles Hummel, 1966, London, Food Trade Press Ltd. There are also many varied shapes of pasta which are prepared and this is also mentioned in the introduction Hummel's book above on macaroni products, pp. 1–6. Some of the pasta is made into nests and skeins and this is mentioned in chapter 10 entitled "Manufacture of Pasta Products" by Dante Baroni, pp. 191–203 in Hummel's book above. In essence, these noodles are prepared to be cooked in a cooking pot containing boiling water and the like and served.

U.S. Pat. No. 4,323,585 relates to a process for producing pasta products in serving portions in packages. This patent refers to nests and other pasta products packed on the basis of eating portions.

U.S. Pat. No. 3,798,343 relates to a process for preparing frozen rolled lasagna. Generally the process used is one where cheese and meat are applied to one face of the single noodle which is then rolled in a spiral and frozen.

U.S. Pat. No. 4,988,528 relates to preparing instant noodles adapted to be cooked in boiling water or the like and then served. This patent particularly relates to fried noodles.

Although many ways of preparing pasta are known, and although many shapes are available, in the art of preparing noodles for instant dishes which noodles are then contained in flexible packaging, for instance, it is difficult to obtain long noodles which can fit within the package since the package is relatively short. Thus, there is a need for a noodle shape which will allow placement into a package of relatively short dimensions. In addition, perforation of the packages can easily result from the sharp corners of cut noodles.

Spiral shapes are well known, for example, U.S. Pat. No. 4,882,175 employs a rolled tape of a confectionery such as bubble gum. In addition, in the baking industry several patents deal with preparing dough in a rolled spiral form such as, for example, U.S. Pat. No. 2,352,617. Instant noodles, however, present completely different problems from preparing dough into a cinnamon bun shape or into rolls of bubble gum. This is so principally because the pasta first must be prepared and precooked to a certain degree, then spiral rolled, then packed into relatively flexible packaging and when cooked, it must be capable of unrolling to its original length without sticking together. Thus, simply rolling pasta into a spiral formation would not permit unrolling upon cooking. The noodles would stick together in a disc and not unroll.

Conventional instant noodles are manufactured by preparing a dough which is then formed into a strip by multi-stage rolls. The strip is steamed to partially cook it, glutenize it and improve its elasticity. It is then cut in the longitudinal direction and subsequently Chopped to the appropriate length, dried, and introduced into an appropriate package either alone or with other materials to constitute instant noodles or for example, instant soup.

The instant noodles or instant soup is then, when ready for consumption, admixed with hot water or boiled until cooking is completed.

SUMMARY OF THE INVENTION

Spiral wound pasta noodle units are prepared which are capable of separating into at least one long strand of pasta when subjected to boiling temperatures by having an anti-sticking and a dough conditioning agent incorporated into the composition and an anti-sticking agent dusted onto the surface of the dough before rolling to substantially prevent sticking together of the spiral upon subsequent cooking.

DESCRIPTION OF THE DRAWINGS

Figure 1:
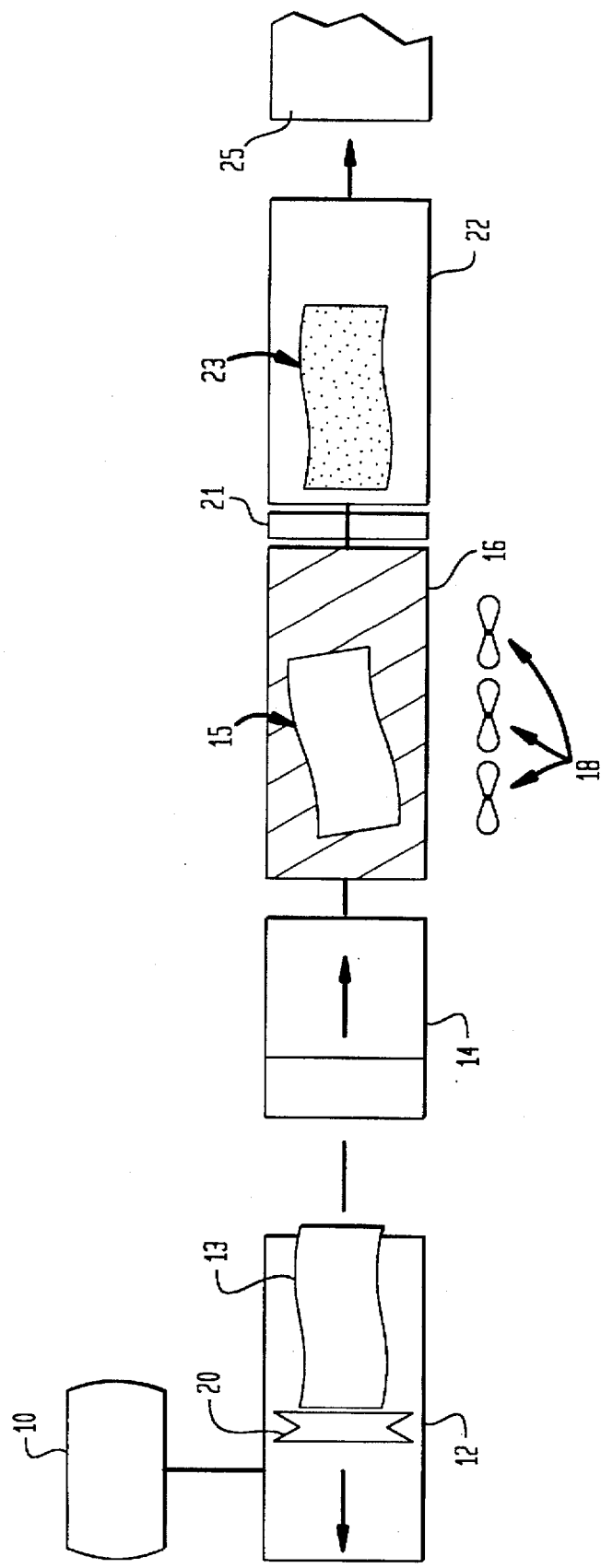
FIG. 1 shows the formation of the pasta sheet.

In FIG. 1 the dough is mixed in mixer 10 and then transferred to roller/sheeter 12 such as a Rondo® sheeter to achieve a workable thickness and texture. The dough is dusted with an anti-sticking agent from dusting trough 20. The worked dough 13 is then steamed in the steam tunnel 14 and the partially cooked dough 15 continues on the conveyor belt 16 past a battery of fans 18 to facilitate drying. The partially dried dough is then dusted with the anti-sticking component from the dusting trough 21. The dusted dough 23 is then introduced to a conveyor 22 which continues into a rolling section 25.

Figure 2:
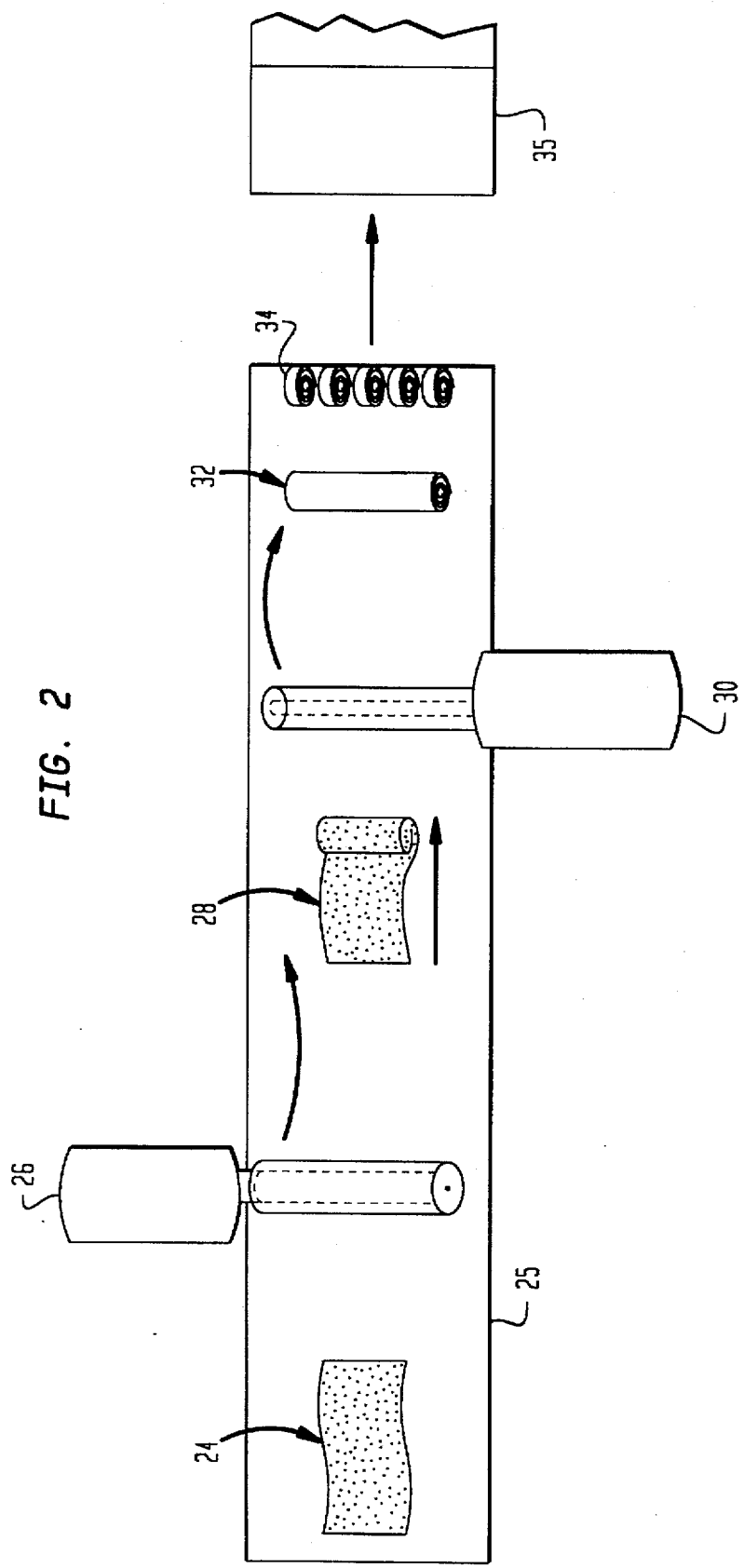
FIG. 2 is a continuation of FIG. 1 showing the rolling of the pasta sheet to form the spiral configuration.

In FIG. 2 the dusted dough 24 is partially rolled by means known in the art through a variable speed roller 26 and then the half rolled sheet 28 contacts a finishing roller 30 to form the fully rolled sheet 32. The fully rolled sheet is then cut into individual spiral rolled units by means known in the art. The individual spiral roll units 34 are then dried in a dryer 35.

DESCRIPTION OF THE PREFERRED EMBODIMENT

The pasta spirals are fabricated by first preparing a dough in a mixer, for example, a Hobart mixer. The dough in turn is formulated by first dry mixing for about five minutes, preferably, Durum Semolina flour with an appropriate amount of soy protein, if desired, and glycerol monostearate or other dough conditioner such as Myvaplex® 600. Mixing allows the ingredients to disperse evenly in the mix and form a useful dough. Addition of the Myvaplex® 600 dough conditioner and the particulate soy fiber helps the dough to release when subsequently rolled and sheeted. Additionally, soy fiber in the mix assists in producing a more workable dough.

To this dry mixture is added a sufficient amount of water at ambient temperature to prepare the dough having a moisture content of about 25% to 35% and mixing is continued for another six to ten minutes.

The dough thus formed is removed and run through a series of rolls, for example, a Rondo sheeter, preferably a dusting agent is employed to assist in sheeting. The thickness of the dough is reduced to a product thickness of about 55 to 65 thousandths of an inch. This rolling or sheeting helps to work the dough to a functional texture and to develop wheat protein gluten. Generally the thickness of the dough will be sufficient so that it can be further worked without ripping or tearing. Over working will break down the gluten structure and the dough will not roll properly.

The worked, pre-dusted dough is then steam cooked for about three minutes at about 8 psi steam pressure in a belt steam tunnel. The temperature in the steam tunnel is about 205° F.–212° F. This pre-gelatinizes the starch and is necessary for instant noodles. Full cooking is not required as further cooking will be done when the noodles are to be cooked and eaten in an instant or "quick cooking" manner. Steaming will also reduce the stickiness of the product. This steam pre-gelatinization gives firmer texture, gives the pasta the ability to withstand longer cooking conditions, the ability to retain texture for longer periods after cooking, helps the product to resist checking during the drying process, and allows quicker final cooking ability. It also forms a better starch matrix in the pasta.

The partially cooked or steamed dough coming out of the steam tunnel is then sprinkled with a light dusting of antistick agent such as soy protein at a level of about 0.1% to 1.00% by weight of the soy protein to the wet dough. The amount of anti-sticking agent employed is enough to prevent sticking. This dusting is critical and promotes separation and unwinding of the pasta spiral during the final cooking process. In addition, on its application to the sheet after steaming it prevents all layers from sticking together.

The dough is then dried to a moisture content of about 15% to 25% by weight. The dusted dried dough is then cut to appropriate lengths and rolled up on itself by methods well known in the art such as those shown in U.S. Pat. No. 2,352,617; 2,383,774 or 2,576,670 and cut into appropriate widths to make spiral noodles of a specified length. The noodles can be cut into selected widths by, for example, the methods shown in U.K. Patent 1,594,713. After cutting the spiral wound noodles, are dried at 120° F. dry bulb and 100° F. wet bulb giving a relative humidity of 49% for about 6–7 hours of drying time to a moisture of about 12% to 14%. Drying allows for long term storage. Some shrinkage of the spiral, leaving spaces between layers occurs. This allows for better separation during the cooking process.

The coiled noodles thus prepared may be packaged in flexible packages thus enabling relatively long noodles to be packaged. The packages are of a size such that the uncoiled length of the noodles are equal to or greater than the filling size opening of the flexible packages. Once the coiled noodles are contained within the packages, the packages are then sealed.

Dough-conditioning Agent

The dough conditioning agent mixed into the dough can be any compound which operates to reduce or substantially prevent sticking of dough to the rollers used to work the dough. Various materials are appropriate and include glycerol monastearate such as the Myvoplex® 600 series obtainable from Eastman Chemical Products. Commercial, food grade glyceryl monastearate, also known as monastearin, is mixture of variable proportions of glyceryl monastearate ($C_{21}H_{42}O_4$, CAS Reg. No. 31566-31-1), glyceryl monopalmitate ($C_{19}H_{38}O_4$, CAS Reg. No. 26657-96-5) and glyceryl esters of fatty acids present in commercial stearic acid. Glyceryl monastearate is prepared by glycerolysis of certain fats or oils that are derived from edible sources or by esterification, with glycerin, of stearic acid that is derived from edible sources. The most prevalent fatty acids include lauric, linoleic, myristic, oleic, palmitic, and stearic. Mono- and diglycerides are manufactured by the reaction of glycerin with fatty acids or the reaction of glycerin with triglycerides in the presence of an alkaline catalyst. The products are further purified to obtain a mixture of glycerides, free fatty acids, and free glycerin that contains at least 90 percent by weight glycerides.

Anti-sticking or Dusting Agent

The anti-sticking or dusting agent part of which is also preferably mixed into the dough, is preferably soy fiber such as FIBRIM® brand soy fiber obtainable from Protein Technologies International. This material is a mixture of structured polysaccharides and includes cellulosic and non-cellulosic carbohydrates.

Cellulose is a principal component of plant structural polysaccharides and is the only true fibrous component of the plant cell wall containing principally alpha ($\alpha$) cellulose.

The non-cellulosic structural polysaccharides are generally referred to as hemicelluloses, which consist of branched or linear polymers of D-xylose, D-galactose, D-mannose, L-arabinose, and L-rhamnose. Hemicelluloses are an integral part of the basic cellulose structure and contribute plastic properties in the cell wall. Unlike $\alpha$-cellulose, hemicelluloses are not crystalline in nature and typically have a higher water-holding capacity. It is significant to note that if the dusting agent is incorporated into the dough by mixing, the dough strength improves for sheeting and the final cooked pasta quality is improved.

In addition, other dusting agents are useful such as oat fiber soy fiber and the like. Generally, the dusting agents are employed to insure that the spirals unroll upon cooking. Fibrim® 1000 and 1450, as well as corn or oat bran and selected starches may also be used.

Flour

The flour employed to prepare the pasta may be any flour resulting in a workable dough, preferably Durum Semolina is used. The methods of pasta manufacture are well known and pasta may be made from a variety of grains. Semolina wheat flour produced from 100% Durum of a very fine grade is preferably used.

Having generally described various aspects of the present invention, the invention will now be more particularly described with reference to the following specific examples.

The following examples are designed to illustrate, but not to limit, the practice of the instant invention. Unless otherwise indicated, all percentages are by weight.

COMPARATIVE EXAMPLE 1

An experiment was run to determine whether a dusting agent could be incorporated in the dough. 2 lb. 8 oz. of semolina were mixed in a Hobart mixer with ½ qt. of water; 22 g. of Myvaplex® 600, glycerol monostearate (GMS), and 17 g. of soy fiber (in dough) Fibrim® 1450.

The material, after mixing, was sheeted on a Rondo Sheeter and dusted with Fibrim® 1450. The sheeted dough is then steamed for three minutes at 8 lbs. pressure. The surface is dried with fans for five minutes. By using a conveyor table setup with a rolling torpedo rod the pasta sheets are rolled onto themselves. The setting of the conveyor speed along with the position of the rolling torpedo and its angle to the pasta will create and determine the size and layer spacing of the pasta roll. A cutting process follows in timed intervals along with the progression of the roll off the torpedo rod. This gives equally sized pasta spirals. The spirals are then dried and tested for functionality. This product did not unroll upon boiling but had good strength during sheeting.

COMPARATIVE EXAMPLE 2

An experiment was run to determine whether semolina could be used as a dusting agent. As in Example 1, the dough is mixed in a Hobart mixer then sheeted on a Rondo sheeter after which it is liberally sprinkled with dry semolina then rolled and dusted. It was dried for 16 hours in a dehydrator. Conclusion: after boiling for 12 minutes, the semolina that is between the layers of the roll does not help separate the layers but is homogeneous to the pasta. It is an agent which becomes part of the pasta and forms one large solid piece.

EXAMPLE 3

To determine whether or not dusting of the pasta roll with oat fiber and corn bran assists in unrolling or cooking. The pasta is formed as in Example 1 but using 1% Williamson 782 oat fiber in the dough. The formulation was prepared and split. Each half was sheeted and dusted, one with corn bran 90 and the other with Canadian Harvest oat fiber L-5. The pieces of pasta were then microwaved for three minutes. Results: both dusting agents help the spiral rolled noodles to separate and leave no gritty taste. However, the 1% Williamson 782 oat fiber in the dough gives a tough fibrous texture to the noddle.

EXAMPLE 4

Experiments were conducted by dusting a dough prepared as in Example 1 with Fibrim® Soy Fiber 1450 to release the dough roll layers while boiling. The method of Example 1 was used. Results: during boiling, the cut rolls released completely with the soy fiber.

COMPARATIVE EXAMPLE 5

The objective was to reduce sticking of the dough during sheeting. Add Myvaplex® 600 to dough prepared as in Example 1 at a level of 1½% to the mixer. The formula was as follows:
2½ lbs. Extra Fancy Durum Flour
½ qt. water
½ oz. salt
1½%=1.1 gr GMS (Myvaplex® 600)
Procedure: The dough was mixed in a 70 qt. Hobart mixer. The dough was sheeted on a Rondo Sheeter, steamed at 8 lb. pressure for 3 minutes time and then rolled. The spiral rolls were dried for 12 hours. The spirals do not release upon boiling.

EXAMPLE 6

Dough was formulated in Example 1 in a 20 qt. Hobart mixer. The following components were used:
2½ lb. semolina
½ qt. water
22 gr. GMS Myvaplex® 600
17 gr. Soy Fiber, either Fibrim® 1450 or 1000.

The dough was sheeted on a Rondo Sheeter while being dusted with Fibrim® 1000 to improve sheeting.

The sheeted dough was steamed for three minutes and the surface dryed with fans for 5 to 10 minutes. The partially dried sheet was again dusted and rolled.

The pasta sheet was rolled by using a conveyor table set up with rolling torpedo rod. Setting the conveyor speed along with the position of the rolling torpedo in various angles will create and determine the size and layer spacing of the pasta roll. A cutting process follows in timed internals along with the progression of the roll off the torpedo rod giving equally sized cuts.

This invention has been described with respect to certain preferred embodiments and various modifications and variations in the light thereof will be suggested to persons skilled in the art and are to be included within the spirit and purview of this application and the scope of the appended claims.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A partially cooked instant pasta composition in the form of a closely wound, compacted spiral, said pasta composition is made of a dough consisting essentially of flour, a dough conditioning agent and water, said pasta composition further having a dusting material selected from the group consisting of soy fiber, oat bran, corn bran starch and mixtures thereof, dusted onto a surface of said composition and interleaved around the spiral form so that upon subsequent boiling the spiral uncoils without substantially sticking together.

2. The pasta of claim 1 wherein said dough conditioning agent is monostearin.

3. The pasta of claim 1 wherein said dusting agent is soy fiber.

4. A process for producing a partially cooked instant pasta composition in the form of a closely wound compacted spiral comprising: preparing a pasta dough by (i) dry blending a combination of fine durum semolina flour with dough conditioning agent for about five minutes;

(ii) adding water to achieve a raw dough moisture of about 25% to 35%;

(iii) mixing the raw dough and sheeting or working the raw dough to achieve a functional texture;

(iv) steaming the raw dough for about three minutes at a temperature of about 100° C. to pre-gelatinize the starch in the raw dough;

(v) Partially drying the pre-gelatinized dough to achieve a moisture content of about 15% to about 25%;

(vi) dusting the partially dried dough with about 0.1 to 1% by weight of soy fiber to promote unwinding of the spiral wound pasta upon cooking;

(vii) rolling the partially dried and dusted dough to form a spiral of appropriate length;

(viii) cutting the spirally rolled dough into separate noodles of appropriate thickness;

(ix) drying the noodles to a moisture content of about 12–14%.

5. A method to insure that tightly wound spirals of instant pasta noodles unroll upon subsequent boiling without adversely affecting the mouthfeel of said noodles comprising interleaving the spirally wound noodles with a dusting composition selected from the group consisting of corn bran, oat bran, soy fiber, and mixtures thereof.

6. A method as defined in claim 5 wherein said soy fiber is a mixture of structured polysaccharides, including cellulosic and non-cellulosic carbohydrates.

7. A method for reducing the breakage of relatively long instant noodles when packed in flexible packages and including a system for enabling the relatively long noodles to be so packed, said noodles having an uncoiled length equal to or greater than the filling size opening of the flexible package comprising:

preparing a pasta dough by dry blending a combination of fine semolina flour with a dough conditioning agent for about five minutes;

adding water to achieve a raw dough moisture of about 25% to 35%;

mixing the raw dough;

sheeting or working the raw dough to achieve a functional texture;

cooking the raw dough for about three minutes at a temperature of about 100° C. to pregelatinize the starch in the dough;

partially drying the pre-gelatinized cooked dough to achieve a moisture content of about 15% to about 25%;

dusting the partially cooked dough with about 0.1 to 1% of soy fiber to promote unwinding of the spiral wound pasta upon cooking;

rolling the partially dried dough to form a spiral of appropriate length;

cutting the rolled dough into the appropriate thickness;

drying the rolled and cut dough to form a plurality of spiral instant pasta noodles;

packing the spiral noodles in a flexible package;

sealing the flexible package.

8. A method as defined in claim 7 whereby the spiral shape of the noodles reduces the incidents of perforations of the flexible packages.

* * * * *